US012452582B2

(12) United States Patent
Baratelli et al.

(10) Patent No.: US 12,452,582 B2
(45) Date of Patent: Oct. 21, 2025

(54) INTEGRATED BAROMETRIC VENT

(71) Applicant: Apple Inc., Cupertino, CA (US)

(72) Inventors: Marco Baratelli, San Francisco, CA (US); Justin D. Crosby, Cupertino, CA (US); Thomas H. Tsang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 18/142,032

(22) Filed: May 2, 2023

(65) Prior Publication Data

US 2024/0007782 A1 Jan. 4, 2024

Related U.S. Application Data

(60) Provisional application No. 63/356,971, filed on Jun. 29, 2022.

(51) Int. Cl.

| | |
|---|---|
| ***H04R 3/00*** | (2006.01) |
| ***H04R 1/02*** | (2006.01) |
| ***H04R 1/28*** | (2006.01) |
| ***H04R 7/10*** | (2006.01) |
| ***H04R 7/18*** | (2006.01) |
| *H04R 9/06* | (2006.01) |
| *H04R 19/04* | (2006.01) |

(52) U.S. Cl.

CPC ........... *H04R 1/2811* (2013.01); *H04R 1/025* (2013.01); *H04R 3/00* (2013.01); *H04R 7/10* (2013.01); *H04R 7/18* (2013.01); *H04R 9/06* (2013.01); *H04R 19/04* (2013.01)

(58) Field of Classification Search

CPC ........ H04R 1/2811; H04R 1/025; H04R 3/00; H04R 7/10; H04R 7/18; H04R 9/06; H04R 19/04

USPC .................................................. 381/113, 111

See application file for complete search history.

(56) References Cited

U.S. PATENT DOCUMENTS

| | | | | |
|---|---|---|---|---|
| 2017/0245038 | A1* | 8/2017 | Chawan .................. | H04R 1/02 |
| 2018/0063634 | A1 | 3/2018 | Ruchir et al. | |
| 2019/0082547 | A1 | 3/2019 | Werner et al. | |
| 2020/0382862 | A1 | 12/2020 | Hrudey et al. | |
| 2022/0256292 | A1* | 8/2022 | Naderyan ................ | H04R 7/06 |

FOREIGN PATENT DOCUMENTS

| | | |
|---|---|---|
| WO | WO 2020/214758 | 10/2020 |

* cited by examiner

*Primary Examiner* — Ammar T Hamid

(74) *Attorney, Agent, or Firm* — BAKERHOSTETLER

(57) ABSTRACT

Improved acoustic devices include water-resistant venting across various surfaces inside acoustic devices such as speakers and microphones. Surfaces such as an acoustic diaphragm, a cover for a resonant chamber, and a cover for an external port of an acoustic transducer may include design features that create or enhance gas-permeable and water impermeable attributes. Such design features include, for example, a series of apertures in the vented surface.

29 Claims, 9 Drawing Sheets

700

INTEGRATED BAROMETRIC VENT

TECHNICAL FIELD

The present description relates generally to acoustic devices including vented liquid-resistant microphone and speaker assemblies.

BACKGROUND

Electronic devices such as computers, media players, cellular telephones, and other electronic equipment are often provided with acoustic components such as microphones. It can be challenging to integrate acoustic components into electronic devices, such as in compact devices including portable electronic devices.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
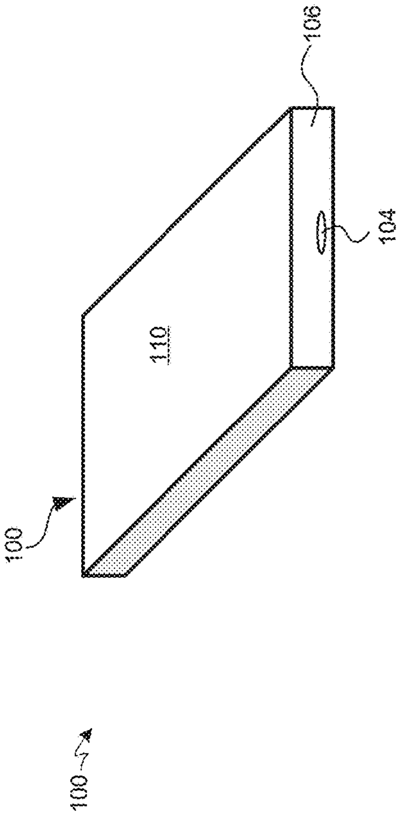
FIG. 1 illustrates a perspective view of an example electronic device having an acoustic transducer, such as a speaker or microphone, in accordance with various aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as desktop computers, televisions, set top boxes, internet-of-things (IoT) devices, and portable electronic devices including mobile phones, portable music players, smart watches, tablet computers, smart speakers, remote controllers for other electronic devices, headphones, earbuds, and laptop computers often include one or more acoustic transducers for converting between an electric signal and acoustic signals such as sound. An acoustic transducer may generate an electronic input signal from a sensor that responds to air movement and/or acoustic signals such as sound (e.g., sound originating from outside a housing of the device) to transduce the electronic input signal; or an acoustic transducer may convert an electronic output signal into sound via a speaker. Sensors may include, as examples, acoustic sensors, which may include microphones for sound input to the device, pressure sensors, and/or ultrasonic sensors.

Acoustic transducers may include volumes of air that are sealed in some way. For example, an acoustic transducer may include a front or back volume of air adjacent to an acoustic diaphragm, a Helmholtz resonator (HHR) volume, other types of resonators, or any combination of such volumes. These volume(s) may be enclosed such that air movement between the volume(s) and air outside an electronic device housing the acoustic transducer may be restricted. Aspects of these disclosure provides techniques, including vents of various sorts, for allowing airflow between enclosed volumes and ambient air outside of the device. Performance of an acoustic transducer may be improved by allowing air pressure to be substantially equalized between the interior of these enclosed volumes and ambient air pressure outside the device. In some aspects, these vents may include both a gas-permeable attribute and a water-impermeable attribute. Vents with gas-permeable (or air-impermeable) and water-impermeable attributes may allow for equalizing of air pressure while simultaneously preventing water from entering the vent. Venting may be useful at various locations including across a diaphragm between a front and back volume, at boundaries of other resonant chambers such as Helmholtz resonator (HHR) volume, at a port between an interior and exterior of and electronic device, and/or along any sound path within or around an acoustic transducer.

For example, an acoustic transducer may include a diaphragm composed of at least a first lamina and a second lamina, and the diaphragm may include a front surface and includes a back surface formed at least in part by the first lamina, and where the second lamina has a gas-permeable attribute. A front volume may be adjacent to the front surface, and a back volume may be adjacent to the back surface. The first lamina may include a first plurality of apertures, each aperture exposing a corresponding inner surface of the second lamina to the back volume. In an aspect, the diaphragm may include a side surface at an edge of the diaphragm, the side surface formed at least in part by the second lamina, and wherein the diaphragm comprises at least one airflow path between the front volume and the back volume, the airflow path extending through at least a portion of the second lamina via the side surface and the first plurality of apertures in the first lamina. In other aspects, the acoustic transducer may include drive electronics and operate as a speaker and/or mic, and the diaphragm may be mounted to a driver support at a portion of the back surface formed at least in part by the first lamina of the diaphragm.

In another example, an acoustic transducer may include a diaphragm composed of at least a first lamina, a second lamina, a third lamina, and a fourth lamina, where the second and fourth lamina are layered between the first and third lamina, and the diaphragm includes a front surface formed at least in part by the third lamina and a back surface formed at least in part by the first lamina. A front volume maybe adjacent to the front surface and a back volume may be adjacent to the back surface. The first lamina may include a first plurality of apertures, the second lamina may include a second plurality of apertures co-located with the first plurality of apertures in the first lamina, and the third lamina may include a third plurality of apertures co-located with the second plurality of apertures in the second lamina. The fourth lamina of the diaphragm may possess gas-permeable and water-impermeable attributes, and the fourth lamina may extend across the second plurality of apertures in the second lamina.

In an aspect, the diaphragm may include a side surface at an edge of the diaphragm and adjacent to the front volume, the side surface formed at least in part by the second lamina. A first airflow path may pass between the front volume and the back volume via the first plurality of apertures, the second plurality of apertures, the third plurality of apertures and through the fourth lamina. A second airflow path may pass between the front volume and the back volume, the second airflow path extending through at least a portion of the second lamina via the side surface and the first plurality of apertures in the first lamina.

In other aspects, the acoustic transducer may include a driver support on which the diaphragm is mounted at a portion of the back surface formed in part by the first lamina of the diaphragm.

FIG. 1 illustrates a perspective view of an example electronic device having an acoustic transducer, such as a speaker or microphone, in accordance with various aspects of the subject technology. In the example of FIG. 1, electronic device 100 has been implemented using a housing 106 that is sufficiently small to be portable and carried or worn by a user (e.g., electronic device 100 of FIG. 1 may be a handheld electronic device such as a tablet computer or a cellular telephone or smart phone, or a wearable device such as a smart watch, a headphone, or an earbud). In the example of FIG. 1, electronic device 100 may include a display such as display 110 mounted on the front of housing 106. Electronic device 100 may include one or more input/output devices such as a touch screen incorporated into display 110, a virtual or mechanical button or switch, and/or other input output components disposed on or behind display 110 or on or behind other portions of housing 106. Display 110 and/or housing 106 may form an enclosure within which components (e.g., one or more processors, volatile or non-volatile memory, a battery, one or more integrated circuits, one or more speakers, or other components) of the electronic device 100 are disposed. Display 110 and/or housing 106 may include one or more openings to accommodate a button, a switch, a speaker, a light source, a sensor such as a microphone, and/or a camera (as examples).

In the example of FIG. 1, housing 106 includes an opening 104 in the housing 106. In this example, opening 104 forms a port for a sensor, such as a microphone, that receives acoustic input, such as sound from the external environment outside of the housing 106. Instead, or in addition, opening 104 may emit acoustic output from a port of a speaker that produces sound. For example, opening 104 may form a port for an acoustic transducer module disposed within housing 106, such as a microphone port for a microphone module disposed within housing 106, an ultrasonic sensor port for an ultrasonic sensor disposed within housing 106, or a speaker port for a speaker disposed within housing 106. One or more additional openings in housing 106 and/or the display 110, though not explicitly shown in FIG. 1, may form ports for additional acoustic transducers disposed within the housing 106.

In aspects, opening 104 may be an open port or may be completely or partially covered with an air-permeable membrane and/or a mesh structure that allows air and sound to pass through the openings. Such a membrane or mesh covering may tend to prevent physical objects, such as dust, and/or liquids, such as water, from entering the device via the opening 104. Although one opening 104 is shown in FIG. 1, this is merely illustrative. One opening 104, two openings 104, or more than two openings 104 may be provided on the top edge and/or the bottom edge of housing 106, and/or one or more openings may be formed on sidewall (e.g., a left or right sidewall). Although opening 104 is depicted, in FIG. 1, on an edge of the housing 106, one or more additional openings for acoustic components and/or sensors may be formed on a rear surface of housing 106 and/or a front surface of housing 106 or display 110. In some implementations, one or more groups of openings 104 in housing 106 may be aligned with an acoustic port of an acoustic component and/or a sensor within housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials. In one example, housing 106 may be formed from a metal peripheral portion that runs (e.g., continuously or in pieces) around the periphery of electronic device 100 to form a top edge, a bottom edge, and sidewalls running therebetween, and/or a metal or glass rear panel mounted to the metal peripheral portion. In this example, an enclosure may be formed by the metal peripheral portion, the rear panel, and display 110, and device circuitry such as a battery, one or more processors, memory, application specific integrated circuits, sensors, antennas, acoustic components, and the like are housed within this enclosure.

However, it should be appreciated that the configuration of electronic device 100 of FIG. 1 is merely illustrative. In other implementations, electronic device 100 may be a computer such as a smart watch, a pendant device, or other wearable or miniature device, a media player, a gaming device, a navigation device, a computer monitor, a television, a headphone, or a somewhat larger device such as a computer that is integrated into a display such as a computer monitor, a laptop computer, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, in other implementations, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a wearable device such as a smart watch. For example, in some implementations, housing 106 may include one or more interfaces for mechanically coupling housing 106 to a strap or other structure for securing housing 106 to a wearer. In some implementations, electronic device 100 may be a mechanical or other non-electronic device in which a microphone can be mounted within the housing, such as a pen or a support structure such as a monitor stand for a computer monitor. In any of these exemplary implementations, housing 106 includes an opening 104 associated with acoustic transducer. In some implementations, electronic device 100 may be provided in the form of a computer integrated into a computer monitor and/or other display, such as a television. Display 110 may be mounted on a front surface of housing 106 and optionally a stand may be provided to support the housing 106 (e.g., on a desktop) and/or housing 106 may be mounted on a surface, such as a wall.

Figure 2:
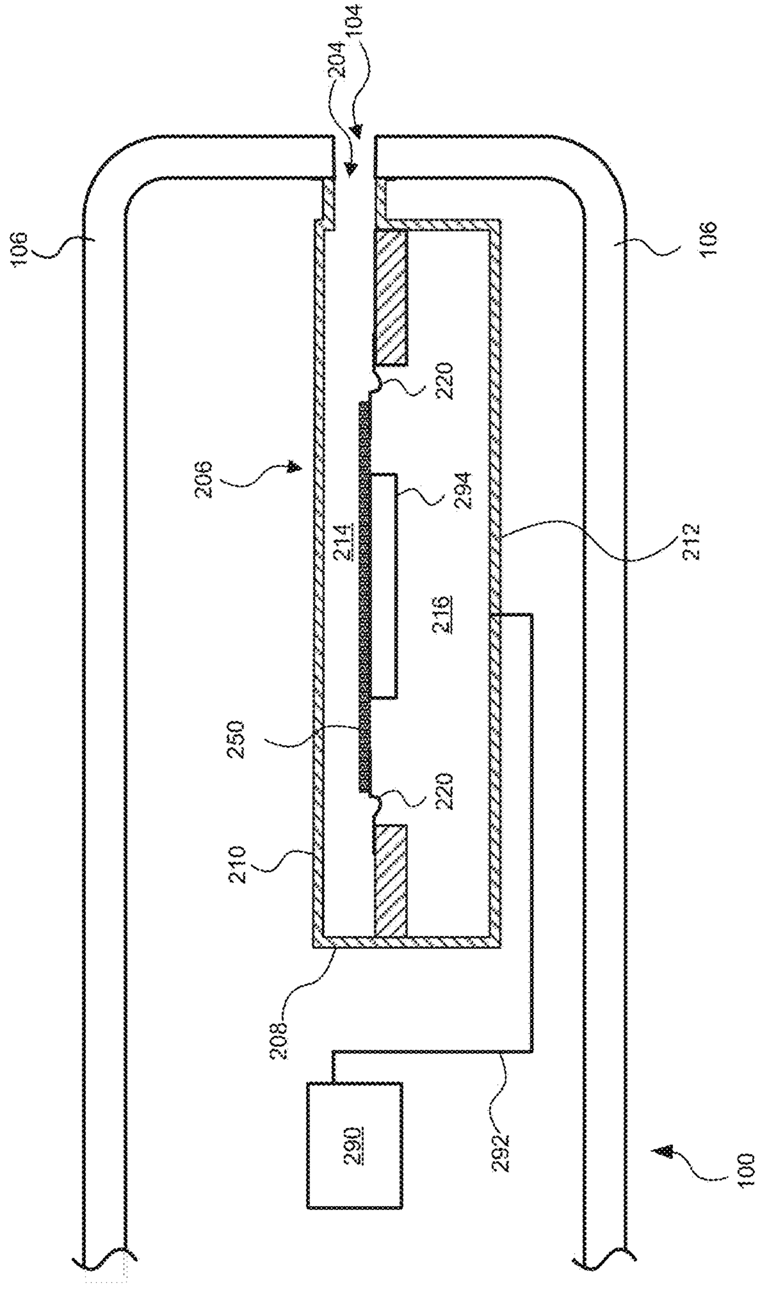
FIG. 2 illustrates a cross sectional view of a portion of an electronic device having an acoustic transducer in accordance with various aspects of the subject technology.

FIG. 2 illustrates a cross sectional view 200 of a portion of the electronic device 100 of FIG. 1 having an acoustic transducer in accordance with various aspects of the subject technology. In FIG. 2, device housing 106 of electronic device 100 includes an transducer module 206, processor 290, and an electronic connection 292 between processor 290 and transducer module 206. Transducer module 206 includes port 204 in transducer housing 208 aligned with opening 104 in device housing 106.

Transducer module 206 may also include a diaphragm 250 and top wall 210. A front volume 214 may be defined, at least in part, by diaphragm 250 and top wall 210. Similarly, a back volume 216 may be defined, at least in part, by diaphragm 250 and back wall 212. Diaphragm 250 may be suspended by driver support 220. Driver circuitry 294, such as a voice coil, may be attached to diaphragm 250 and may interact with processor 290 via electronic connection 292. Alternately, or in addition to driver circuitry 294, sensor circuitry (not depicted) may interact with processor 290 via electronic connection 292.

Figure 4A:
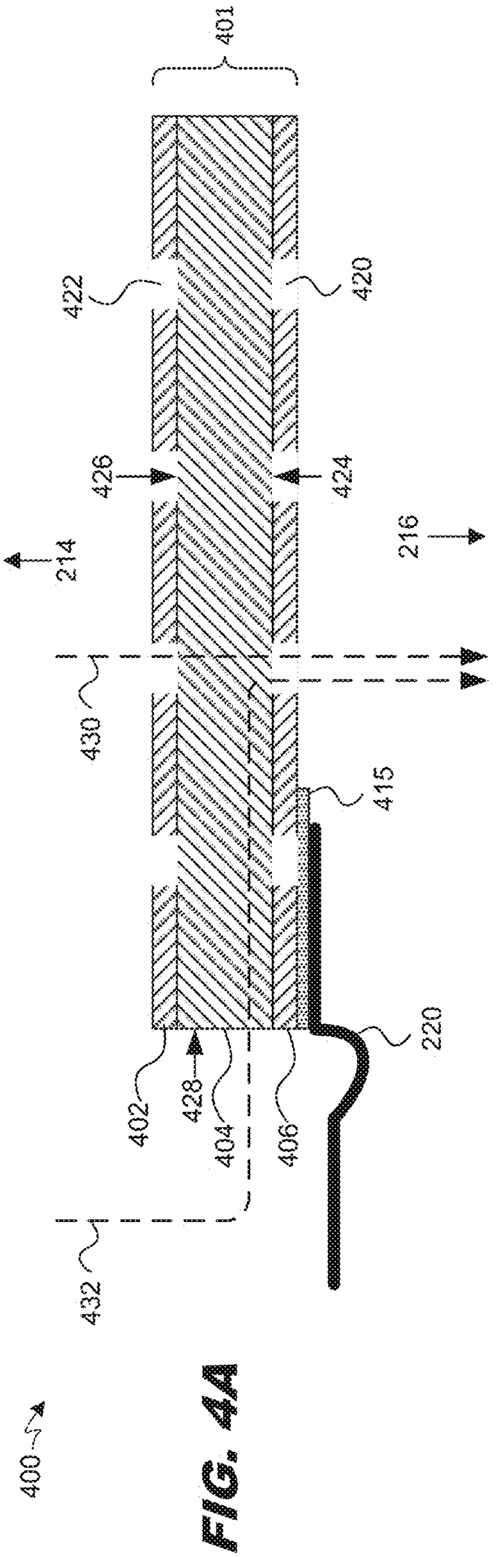
FIG. 4A is a cross-sectional side view of a laminate acoustic diaphragm in accordance with various aspects of the subject technology.
Figure 6A:
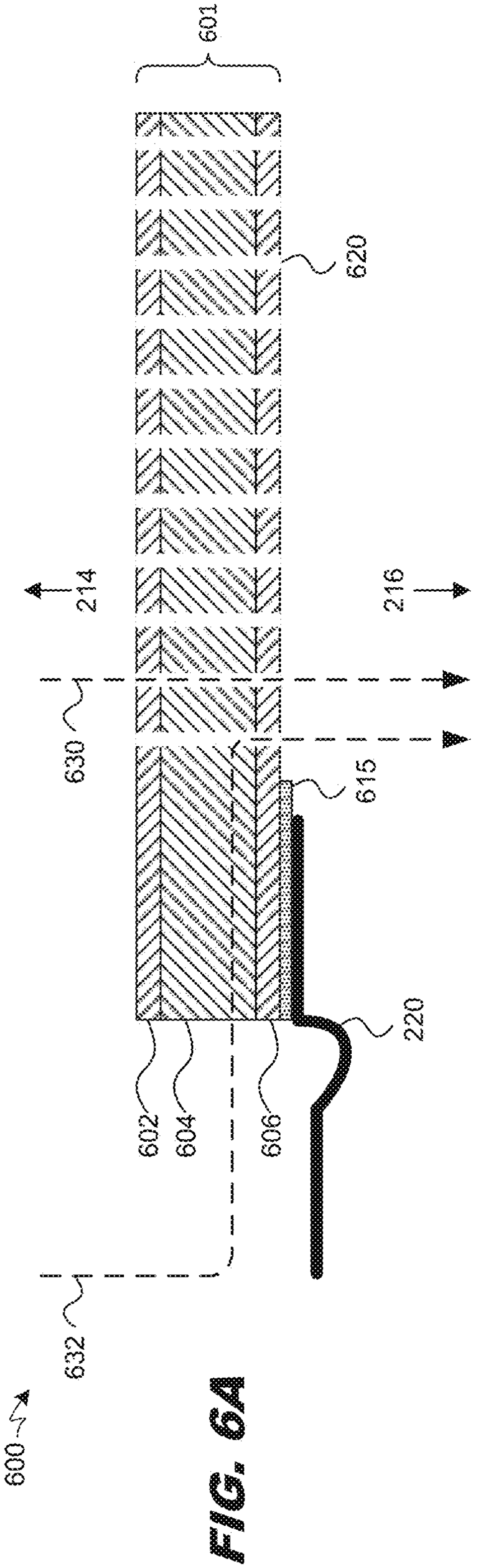
FIG. 6A is a cross-sectional side view of a laminate acoustic diaphragm in accordance with various aspects of the subject technology.
Figure 6B:
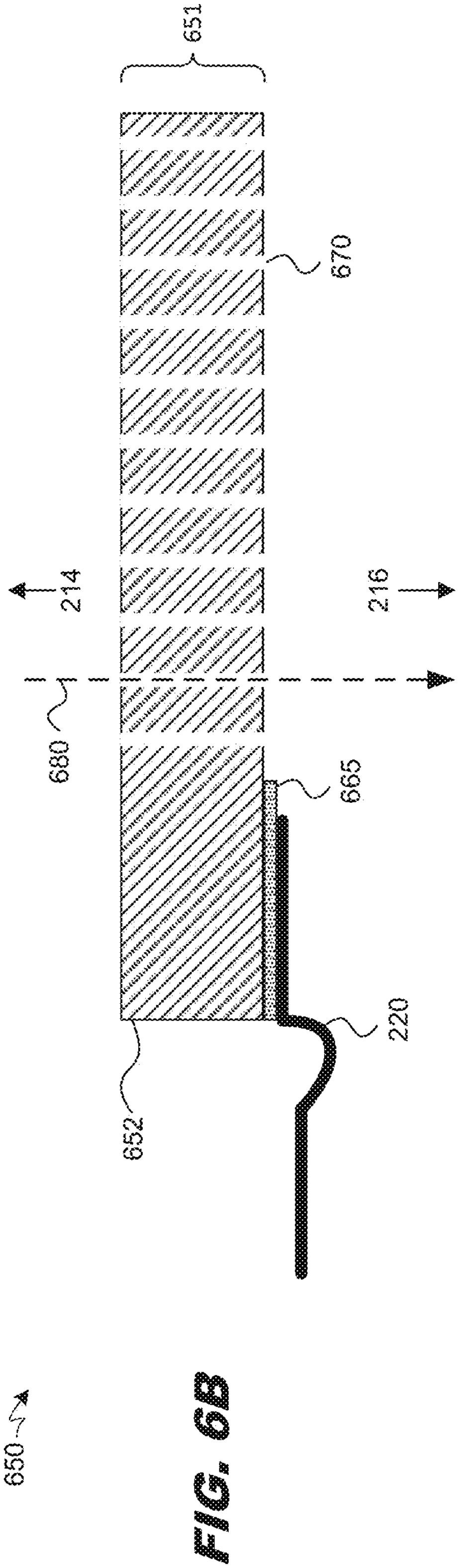
FIG. 6B is a cross-sectional side view of an acoustic diaphragm in accordance with various aspects of the subject technology.

In aspects, diaphragm 250 may be composed of a laminate structure, such as those depicted in FIGS. 4A/B, 5A/B and 6A, while in other aspects, diaphragm may by a non-laminate or single layer structure such as depicted in FIG. 6B. Diaphragm 250 may include one or more gas- or air-permeable attributes and water-impermeable attributes. These attributes may be incorporated into diaphragm via a variety of design elements, such as in the material of, or apertures in, one or more lamina layers of diaphragm 250, for example as described further below with regard to other figures.

Figure 3:
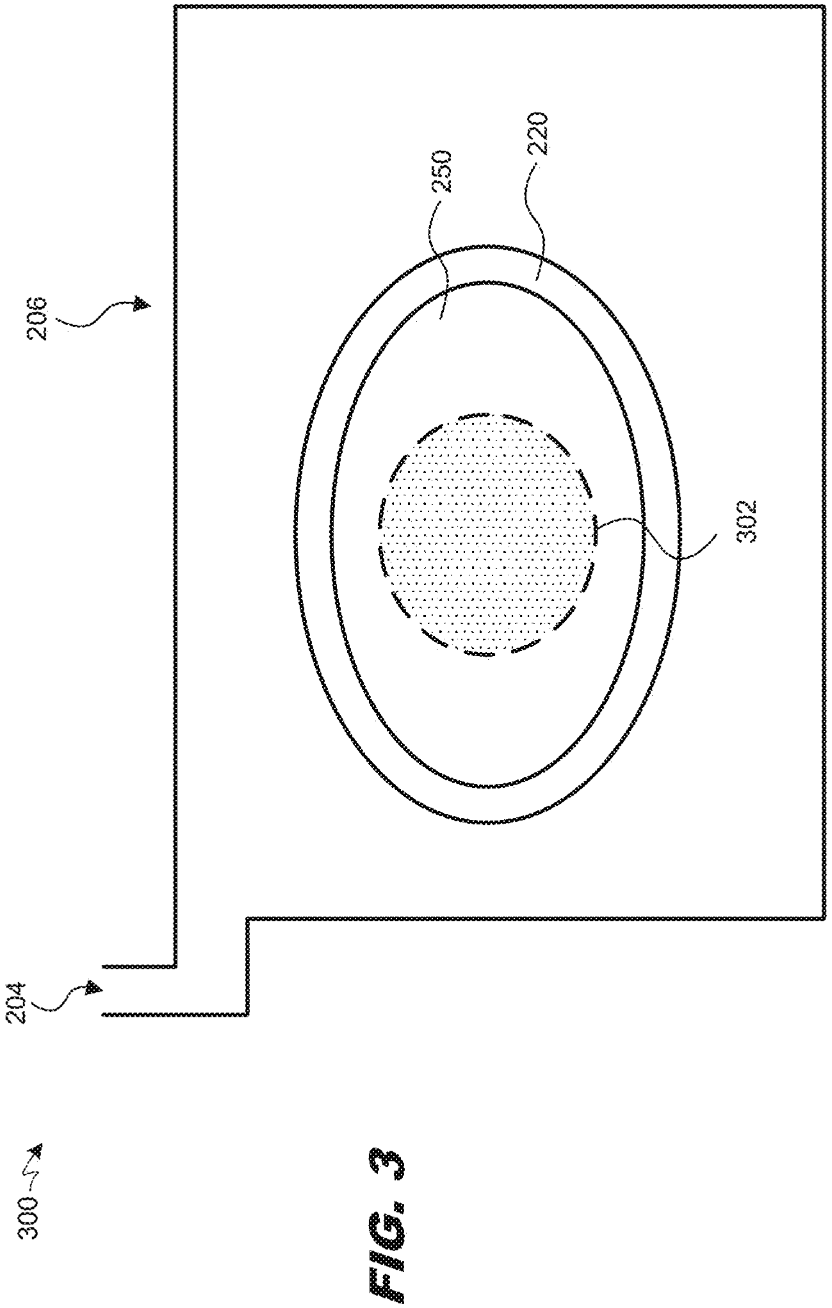
FIG. 3 is a top view of an audio transducer module in accordance with various aspects of the subject technology.

FIG. 3 is a top view 300 of audio transducer module 206 in accordance with various aspects of the subject technology. Transducer module 206 includes port 204 and diaphragm 250 mounted on drive support 220. In FIG. 3, diaphragm 250 is depicted as oval shaped and surrounded by driver support 220. However, implementations of this disclosure are not so limited. For example, diaphragm 250 may be circular or other shapes. In an aspect, a portion 302 of diaphragm 250 may include one or more gas-permeable and/or water-impermeable attributes. As depicted in FIG. 3, portion 302 may be a central portion of diaphragm 250, and some gas-permeable attributes may be limited to portion 302 while a remaining portion of diaphragm 250 surrounding portion 302 may not include those attributes. Gas-permeable diaphragm attributes may be enabled, for example, via apertures in one or more lamina layers constituting diaphragm 250, and such apertures may be distributed substantially uniformly in a two-dimensional pattern across the two-dimensional area of portion 302. In other aspects, a gas-permeable attribute and/or a water-impermeable attribute may be distributed across the entire surface (or substantially the entire surface) of diaphragm 250 without regard to portion 302.

FIG. 4A is a cross-sectional side view 400 of a laminate acoustic diaphragm 401 in accordance with various aspects of the subject technology. Diaphragm 401 may be one example laminate implementation of diaphragm 250 of FIG. 2. In the example of FIG. 4A, diaphragm 401 includes three layers of lamina, first, second and third lamina 406, 404, and 402, including outer layer lamina 402, 406 and inner layer lamina 404. Diaphragm 401 is mounted on driver support 220 at or near an edge of diaphragm 401. In an aspect, diaphragm 401 may be attached to driver support 220 via adhesive 415. Back volume 216 may be adjacent to a back surface of diaphragm 401, and the back surface of diaphragm 401 may include first lamina 406; front volume 214 may be adjacent to a top surface of diaphragm 401, and the top surface of diaphragm 401 may be composed of the third lamina 402. The bottom lamina 406 includes a series of apertures 420 (only one of which is labeled in FIG. 4A), each of which expose a lower inner surface 424 of middle lamina 404 to back volume 216. Similarly, top lamina 402 includes a series of apertures 422 (only one of which is labeled in FIG. 4A), each of which expose an upper inner surface 426 of middle lamina 404 to front volume 214. In an aspect, some or all apertures 420 may have corresponding aperture 422 co-located on diaphragm 401.

In an aspect, the series of apertures 420 and/or 422 may be distributed uniformly across diaphragm 401, or may be distributed in a repeating two-dimensional pattern. In another aspect, the series of apertures 420 and/or 422 may be distributed over a sub-portion of diaphragm 401, such as central portion 302, or apertures 420 and/or 422 may be distributed over substantially all of diaphragm 401. In other aspects, the shape and dimensions of the apertures in lamina of this disclosure, such as laminae 402 and 406, may vary to produce different attributes of an aperture or attributes of a lamina with the aperture. For example, see the variety of apertures in FIGS. 8A-8D.

In an aspect of the example diaphragm 401 depicted in FIG. 4A, outer laminae 402 and 406 may be composed of a first material with certain attributes, while the middle lamina 404 may be composed of a second material with different attributes. The material of outer laminae 402 and 406 may include both a water- and gas-impermeable attribute, while the material of lamina 404 may include gas-permeable and water-impermeable attribute. Gas may pass through lamina 402 and 406 at apertures 422 and 420 despite a gas-impermeable attribute of material constituting the laminae 402 and 404, meanwhile gas may pass anywhere through middle lamina 404. In an aspect, inner lamina 404 may be composed of a foam material such as Rohacell® with water-impermeable and gas-permeable attribute, while outer laminae 402, 406 may be composed of a solid material such as a metal with both a water-impermeable and gas-impermeable attribute.

Arrangement of laminae material attributes and apertures may enable multiple airflow paths through diaphragm 401.

An optional first airflow path 430 flows vertically through diaphragm 401 through corresponding co-located apertures 420, 422. FIG. 4A depicts a single path 430, but similar vertical airflow paths may exist at some or all pairs of apertures 422, 420. Vertical airflow path 430 passes through middle lamina 404 at corresponding upper and lower inner surfaces 426, 424. An optional second airflow path 432 flows partly horizontally and passes through laminae 404 and 406 (and not through top lamina 402). Airflow path 432 enters the diaphragm via side surface 428 of middle lamina 404, and exits at inner surface 424 of middle lamina 404 at one or more apertures 420 in the bottom lamina 406. In an aspect, the airflow paths described herein may allow flow of various gasses, including air. Similarly, a gas-permeable attribute as used herein may include an air-permeable attribute.

As depicted in the figures, airflow paths, such as 430, 432, flow from front volume 214 to back volume 216, which may occur when front volume pressure is higher than back volume pressure. In other situations where the pressure differential is reversed, air may flow along the same path 430, 432, but in opposite directions as depicted in the figures.

In some aspect of this disclosure, one or more vertical airflow paths 430 via upper apertures 422 may coexist with one or more partly horizontal air flow paths 432 via side surface 428. In other aspects, only one type of airflow path, either airflow path 423 via a side surface such as 428 or air flow path 430 via an upper lamina aperture such as 422, may exist in some implementations.

It some situations, it may be particularly advantageous to include both vertical and partly horizontal types of airflow paths. While in some cases, vertical airflow path 430 may be enable faster pressure equalization (when corresponding apertures 422 are not blocked) as compared to partly horizontal airflow path 432, for example due to the comparative length of the paths through middle layer lamina 404. The existence of the partly horizontal path, even though it is slower, may be helpful if apertures 422 become blocked. For example, referring to FIG. 2, if ambient pressure outside electronic device 100 drops sufficiently quickly and/or by a sufficient amount, a large pressure differential may develop between front volume 214 and back volume 216. As the pressure differential may result in the higher-pressure gas in back volume 216 pressing upward on diaphragm 250, causing diaphragm 250 to move into the front volume 214 and toward top wall 210. Driver support 220 may be fixed such as to prevent the sides of diaphragm 250 from moving much despite the pressure differential, while the center of diaphragm 250 may be stretched to move further toward top wall 210 as compared to the sides of the diaphragm. Returning to FIG. 4A, if diaphragm 401 were to extend sufficiently far into front volume 214 such that a top surface of diaphragm 401 (or a portion of the top surface) touches a structure such as top wall 210 of FIG. 2, some or all of apertures 422 may become blocked by the structure, which may restrict airflow along vertical airflow path 430 via upper inner surface 426 of middle lamina 404. In these cases of severe and/or sudden ambient pressure change, the existence of an alternate airflow path 432 through side surface 428 may allow a pressure differential across diaphragm 401 to equalize even when all top apertures 422 are blocked.

Modern mobile and miniaturized devices may benefit from combining both vertical an partly horizontal airflow paths. Some modern design constrains for acoustic transducers require perennially shrinking device dimensions, including, for example, shrinking dimensions of front volume 214. This may lead to a small distance between diaphragm 250 and top wall 210, and hence an increased in likelihood of contact between them as the design distance between them is reduced. In such miniaturized acoustic transducer designs, an airflow design via a side surface such as side surface 428 of lamina 404 may be particularly beneficial.

In an aspect of this disclosure, a shape of apertures and/or dimensions of apertures, such as apertures 420, 422, and other apertures depicted in other figures, may provide a gas-permeable and water-impermeable attribute to a lamina layer. For example, apertures may be sized large enough to enable gas to pass, but also small enough to discourage fluid such as water from passing through the aperture. Apertures may have straight sides through the thickness of a lamina, such as aperture 422 are depicted in FIG. 4A. In other implementations apertures may have sloped sizes. For example, a cross section of an aperture may be trapezoidal in shape such that a first diameter of an aperture is larger on one side of lamina than a second diameter of the aperture on the opposite side of the lamina.

In another aspect, a water-impermeable attribute may be created or enhanced by application of hydrophobic treatments to a surface of a diaphragm or a surface of a lamina of the diaphragm. Hydrophobic treatments may include hydrophobic coatings, hydrophobic platings, and/or hydrophobic laser etchings. For example, one or more of such hydrophobic treatments may be applied to a top surface of lamina 402 that is adjacent to the front volume 214. Hydrophobic treatments may also be applied to other lamina surfaces in FIG. 4A, or other lamina depicted other figures.

Figure 4B:
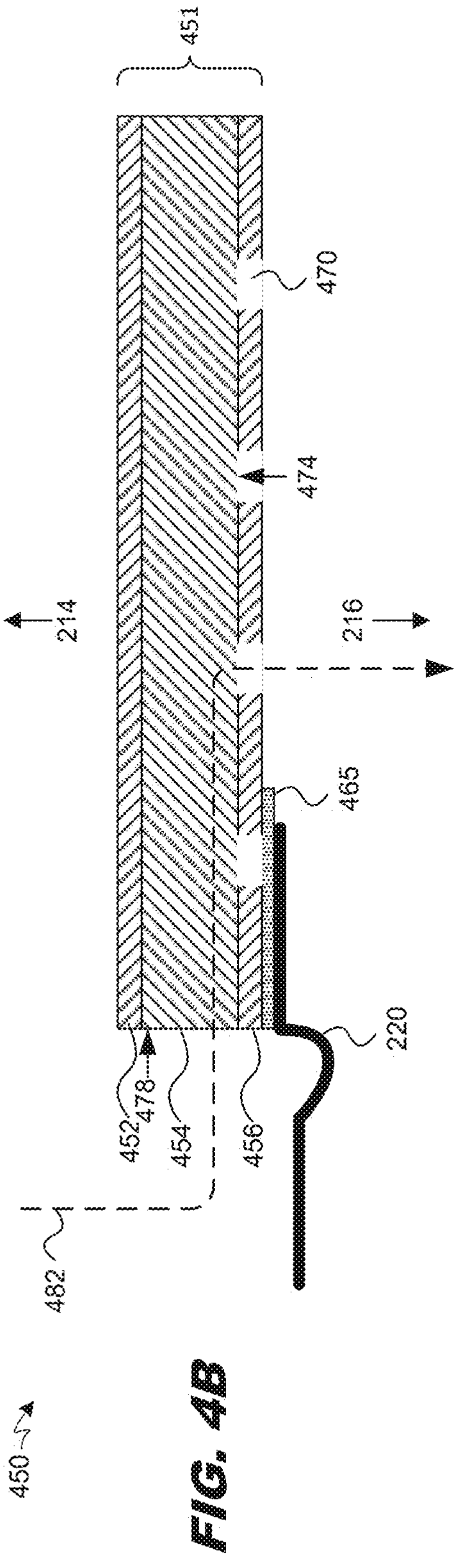
FIG. 4B is a cross-sectional side view of a laminate acoustic diaphragm in accordance with various aspects of the subject technology.

FIG. 4B is a cross-sectional side view 450 of a laminate acoustic diaphragm 451 in accordance with various aspects of the subject technology. Diaphragm 451 may be one example laminate implementation of diaphragm 250 of FIG. 2. In the example of FIG. 4B, diaphragm 451 includes three layers of lamina, first, second and third lamina 456, 454, and 452, including outer layer lamina 452, 456 and inner layer lamina 454. Diaphragm 451 is mounted on driver support 220 at or near an edge of diaphragm 451. In an aspect, diaphragm 451 may be attached to driver support 220 via adhesive 465. Back volume 216 may be adjacent to a back surface of diaphragm 451, and the back surface of diaphragm 451 may include first lamina 456; front volume 214 may be adjacent to a top surface of diaphragm 451, and the top surface of diaphragm 451 may be composed of the third lamina 452. The bottom lamina 456 includes a series of apertures 470 (only one of which is labeled in FIG. 4B), each of which expose a lower inner surface 474 of middle lamina 404 to back volume 216.

Unlike diaphragm 401 of FIG. 4A, top lamina 452 of diaphragm 451 may not include apertures. In the example of FIG. 4B, a partly horizontal airflow path 482 may run through middle lamina 454 via surfaces 478 and 474. As with the apertures of FIG. 4A, apertures 470 may be distributed uniformly or in a pattern over substantially all, or only a portion, of diaphragm 451. Outer laminae 456, 452 may be composed of a first material with certain attributes, while the middle lamina 454 may be composed of a second material with different attributes. In an aspect, inner lamina 454 may be composed of a foam material such as Rohacell® with water-impermeable and gas-permeable attribute, while outer laminae 452, 456 may be composed of a solid material, such as a metal, with both a water-impermeable and gas-impermeable attribute.

Figure 5A:
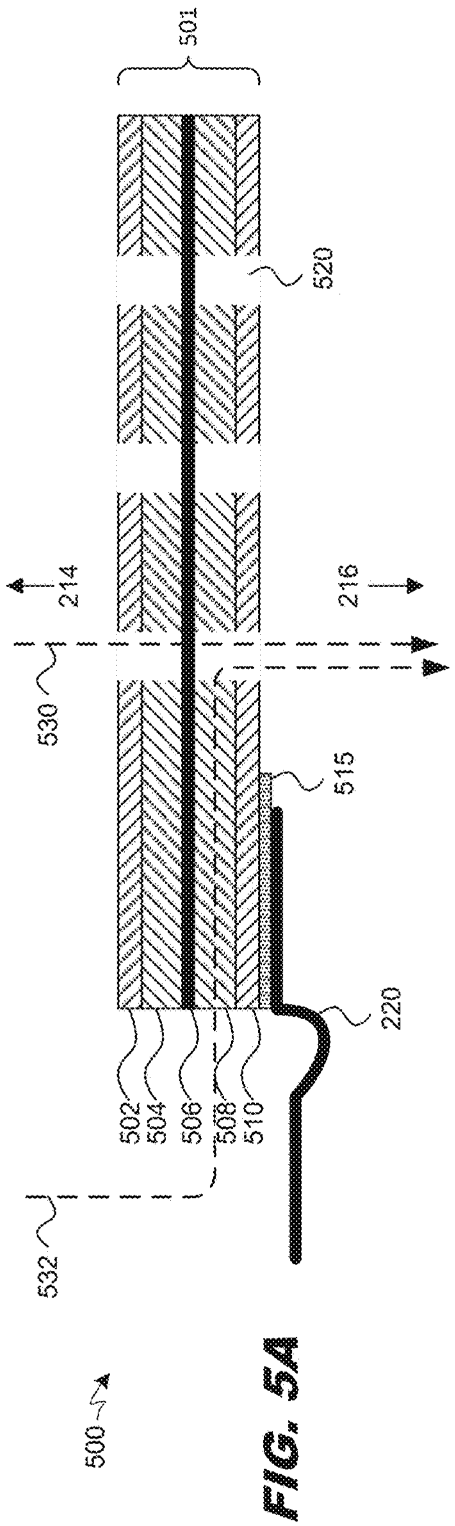
FIG. 5A is a cross-sectional side view of a laminate acoustic diaphragm in accordance with various aspects of the subject technology.

FIG. 5A is a cross-sectional side view 500 of a laminate acoustic diaphragm 501 in accordance with various aspects of the subject technology. Diaphragm 501 may be one example laminate implementation of diaphragm 250 of FIG. 2. In the example of FIG. 5A, diaphragm 501 includes five layers of lamina, first, second, third, fourth, and fifth lamina 510, 508, 506, 504, and 502, respectively, including outer layer lamina 510, 502 and inner layer lamina 508, 506, and 504. Diaphragm 501 is mounted on driver support 220 at or near an edge of diaphragm 501. In an aspect, diaphragm 501 may be attached to driver support 220 via adhesive 515. Back volume 216 may be adjacent to a back surface of diaphragm 501, and the back surface of diaphragm 501 may include first lamina 510; front volume 214 may be adjacent to a top surface of diaphragm 501, and the top surface of diaphragm 501 may be composed of the fifth lamina 502.

In the example of FIG. 5A, each laminae 510, 508, 504, and 502 may include a series of co-located apertures 520 (only one of which is labeled in FIG. 5A), while lamina 506 may not include co-located apertures. In the Example of FIG. 5A, two types of airflow paths may exist, include vertical path 530 though all lamina where aperture exist, and partly horizontal path 532 via a side surface of diaphragm 501. Outer laminae 510 and 502 may be composed of a first material with certain attributes, laminae 504 and 508 may be composed of a second material with different attributes, and lamina 506 may be composed of a third material. In an aspect, laminae 502 and 510 may have a gas-impermeable and water-impermeable attribute, while laminae 508, 506, and 504 may have gas-permeable and water impermeable attributes. For example, lamina 508 and 504 may be composed of a foam material such as Rohacell® with water-impermeable and gas-permeable attributes, lamina 506 may be composed of a membrane such as Teflon™ with water-impermeable and gas-permeable attributes, and outer laminae 502, 510 may be composed of a solid material, such as a metal, with water-impermeable and gas-impermeable attributes.

Figure 5B:
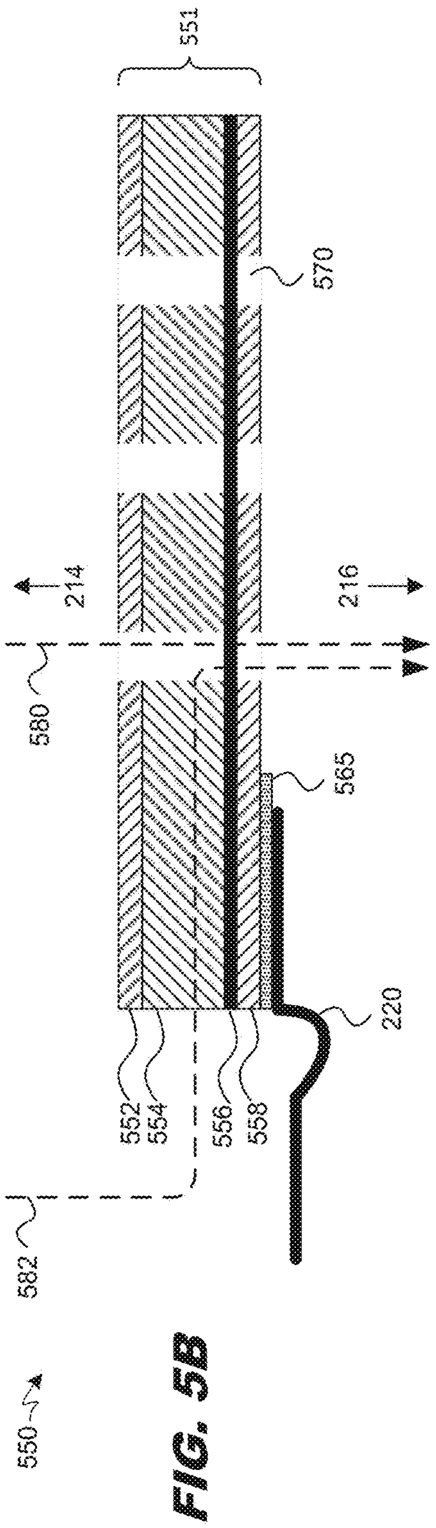
FIG. 5B is a cross-sectional side view of a laminate acoustic diaphragm in accordance with various aspects of the subject technology.

FIG. 5B is a cross-sectional side view 550 of a laminate acoustic diaphragm 551 in accordance with various aspects of the subject technology. Diaphragm 551 may be one example laminate implementation of diaphragm 250 of FIG. 2. In the example of FIG. 5B, diaphragm 551 includes four layers of lamina, first, second, third, and fourth lamina 558, 556, 554, and 552, respectively, including outer layer lamina 558, 522 and inner layer lamina 556, and 554. Diaphragm 551 is mounted on driver support 220 at or near an edge of diaphragm 551. In an aspect, diaphragm 551 may be attached to driver support 220 via adhesive 565. Back volume 216 may be adjacent to a back surface of diaphragm 551, and the back surface of diaphragm 551 may include first lamina 558; front volume 214 may be adjacent to a top surface of diaphragm 551, and the top surface of diaphragm 551 may be composed of the fifth lamina 552.

In the example of FIG. 5B, each laminae 558, 554, and 552 may include a series of co-located apertures 570, while lamina 556 may not include co-located apertures. In the example of FIG. 5B, two types of airflow paths may exist, include vertical path 580 though all lamina where aperture exist, and partly horizontal path 582 via a side surface of diaphragm 551. Outer laminae 552 and 558 may be composed of a first material with certain attributes, lamina 554 may be composed of a second material with different attributes, and lamina 556 may be composed of a third material. In an aspect, laminae 552 and 558 may have a gas-impermeable and water-impermeable attribute, while laminae 554, and 556 may have gas-permeable and water impermeable attributes. For example, lamina 554 may be composed of a foam material such as Rohacell® with water-impermeable and gas-permeable attributes, lamina 556 may be composed of a membrane such as Teflon™ with water-impermeable and gas-permeable attributes, and outer laminae 552, 558 may be composed of a solid material, such as a metal, with water-impermeable and gas-impermeable attributes.

FIG. 6A is a cross-sectional side view 600 of a laminate acoustic diaphragm 601 in accordance with various aspects of the subject technology. Diaphragm 601 may be one example laminate implementation of diaphragm 250 of FIG. 2. In the example of FIG. 6A, diaphragm 601 includes three layers of lamina, first, second, and third, lamina 606, 604, and 602, respectively, including outer layer lamina 606, 602 and a middle layer lamina 604. Diaphragm 601 is mounted on driver support 220 at or near an edge of diaphragm 601. In an aspect, diaphragm 601 may be attached to driver support 220 via adhesive 615. Back volume 216 may be adjacent to a back surface of diaphragm 601, and the back surface of diaphragm 601 may include first lamina 606; front volume 214 may be adjacent to a top surface of diaphragm 601, and the top surface of diaphragm 601 may be composed of the third lamina 602.

In the example of FIG. 6A, each laminae 606, 604 and 602 may include a series of co-located apertures 620 (only one of which is labeled in FIG. 6A). Apertures 620 may be micro perforations, for example created by a laser. The micro perforations may have dimensions small enough to prevent water passing through the micro perforations while still allowing air or other gasses to pass through the micro perforations. In this way, the micro perforations may provide water-impermeable and gas-permeable attributes. In the Example of FIG. 6A, two types of airflow paths may exist, including vertical path 630 though all laminae, and partly horizontal path 632 via a side surface of diaphragm 601. Outer laminae 606 and 602 may be composed of a first material with certain attributes, middle lamina 604 may be composed of a second material with different attributes. In an aspect, laminae 602 and 606 may have a gas-impermeable and water-impermeable attribute, while lamina 604 may have gas-permeable and water-impermeable attributes. For example, middle lamina 604 may be composed of a foam material such as Rohacell® with water-impermeable and gas-permeable attributes, and outer laminae 606, 602 may be composed of a solid material, such as a metal, with water-impermeable and gas-impermeable attributes.

FIG. 6B is a cross-sectional side view 650 of an acoustic diaphragm 651 in accordance with various aspects of the subject technology. Diaphragm 651 may be one example implementation of diaphragm 250 of FIG. 2. In the example of FIG. 6BA, diaphragm 651 includes just one layer 652. For example, diaphragm 651 may be a non-laminate and composed of a solid material. Diaphragm 651 is mounted on driver support 220 at or near an edge of diaphragm 651. In an aspect, diaphragm 651 may be attached to driver support 220 via adhesive 665. Back volume 216 may be adjacent to a back surface of diaphragm 651; front volume 214 may be adjacent to a top surface of diaphragm 651.

In the example of FIG. 6B, the diaphragm 651 may include a series of apertures 670 (only one of which is labeled in FIG. 6B). Apertures 670 may be micro perforations, for example created by a laser. The micro perforations may have dimensions small enough to prevent water passing through the micro perforations while still allowing air or other gasses to pass through the micro perforations. In this way, the micro perforations may provide water-impermeable and gas-permeable attributes. In the Example of FIG. 6B, airflow path 680 may allow gas such as air to pass between front volume 214 and back volume 216, such as when there is an air or gas pressure difference between the front and back volumes. In an aspect, solid layer 652 may have a gas-impermeable and water-impermeable attribute.

Figure 7:
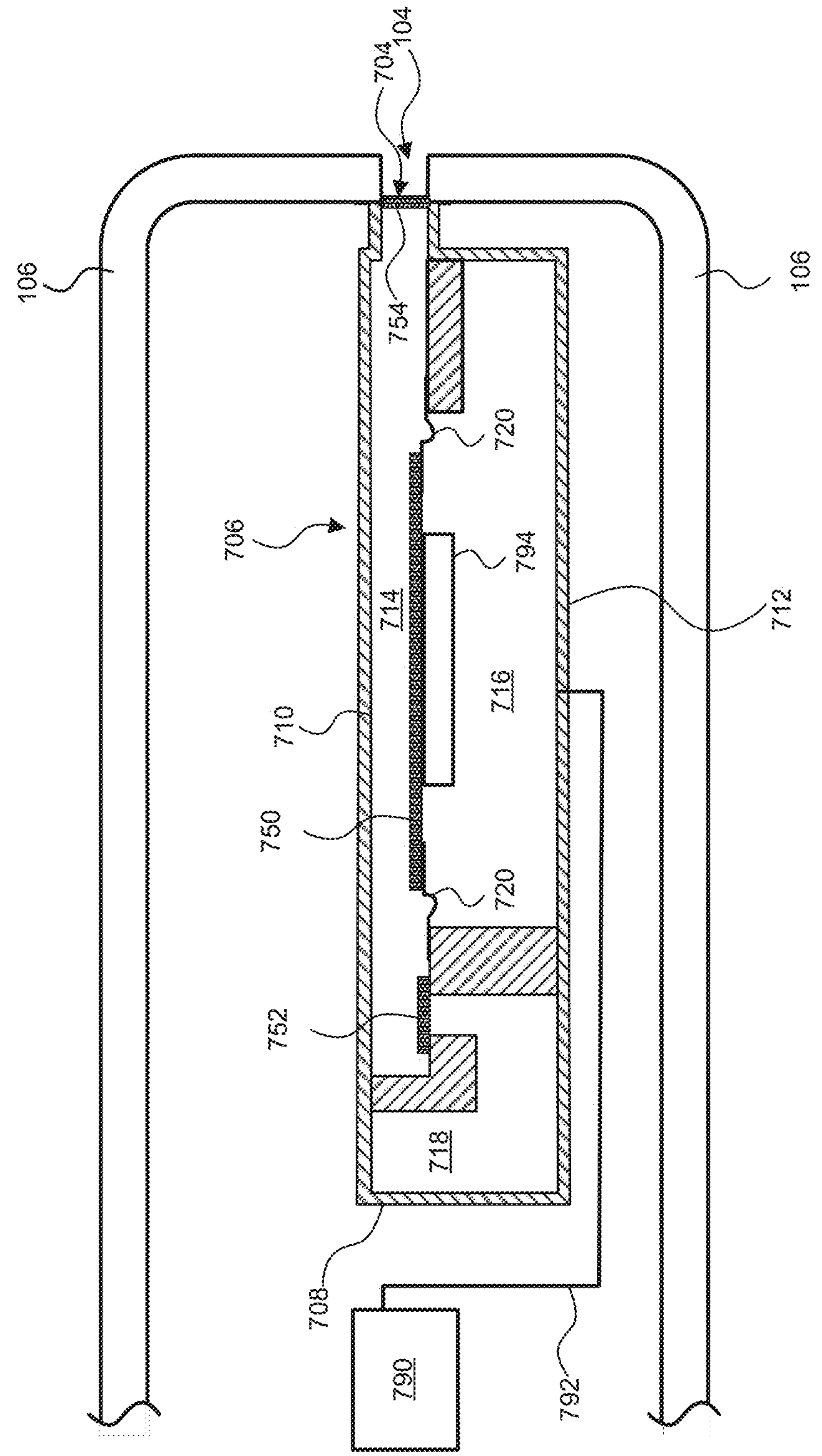
FIG. 7 illustrates a cross sectional view of an example portion of the electronic device of FIG. 1 having an alternate acoustic transducer in accordance with various aspects of the subject technology.

FIG. 7 illustrates a cross sectional view 700 of an example portion of the electronic device 100 of FIG. 1 having an alternate acoustic transducer in accordance with various aspects of the subject technology. In the example of FIG. 7, device housing 106 of electronic device 100 includes alternate transducer module 706, processor 790, and an electronic connection 792 between processor 290 and transducer module 206. Transducer module 706 includes port 704 in transducer housing 708 aligned with opening 104 in device housing 106.

Similar to FIG. 2, alternate transducer module 706 may also include a diaphragm 750 and top wall 710. A front volume 714 may be defined, at least in part, by diaphragm 750 and top wall 710. A back volume 716 may be defined, at least in part, by diaphragm 750 and back wall 712. Diaphragm 750 may be suspended by driver support 720 and may include attributes, and be composed of materials, similar to those discussed above regarding diaphragm 250. Driver circuitry 794, such as a voice coil, may be attached to diaphragm 750 and may interact with processor 790 via electronic connection 792. Alternately, or in addition to driver circuitry 794, sensor circuitry (not depicted) may interact with processor 790 via electronic connection 792.

Unlike FIG. 2, port 704 may be covered by an optional port cover 754. Alternate transducer module 706 may include an optional resonant chamber 718 and corresponding optional path cover 752 covering an acoustic path between front volume 714 and resonant chamber 718. Resonant chamber 718 may be, for example, a Helmholtz resonator (HEIR). Port cover 754 and/or path cover 752 may have gas-permeable and water-impermeable attributes. These attributes may be provided in port cover 754 and/or path cover 752 by a variety of techniques including apertures with specialized shapes and/or dimensions, such as the apertures depicted in FIGS. 8A-8D.

In an aspect, port cover 754 and/or path cover 752 may be made of a solid material such as metal with apertures formed by laser cutting, chemical etching, and/or stamping. Port cover 754 and/or path cover 752 may be insert molded by positioning a metal cover over port 704 and/or an acoustic path of resonant chamber 718 which is held in place by its surrounding walls defining front volume 714. In another aspect, the port cover and/or path cover 752 may be created by adding apertures to an existing wall such as the wall defining front volume 214, such as top wall 710.

In other implementations (not depicted), a path cover in top wall 710 may cover a path to a resonant chamber positioned above top wall 710. In an aspect of this implementation, the top cover in the top wall 710 may be composed of the top wall 710 itself with apertures as described elsewhere herein.

Acoustic covers described herein, such as path cover 752 and port cover 754, may provide advantages over alternate designs such as covers composed of a die cut adhesive and mesh stack. For example, tolerances for die cutting mesh and tolerances for manufacturing placement mesh may not be as good as solid covers described here. Furthermore, design and manufacturing processes for tuning resonant chambers may be simplified by adjusting size, shape, or placement of apertures instead of swapping meshes with different opening sizes from different manufactures.

In other aspects, a water-impermeable attribute of port cover 754, path cover 752, or a solid or single layer diaphragm such as diaphragm 651 (FIG. 6B) may be enhanced or created by applying hydrophobic coatings, hydrophobic platings, and/or hydrophobic laser etchings to a surface of the cover or diaphragm.

Figure 8A:
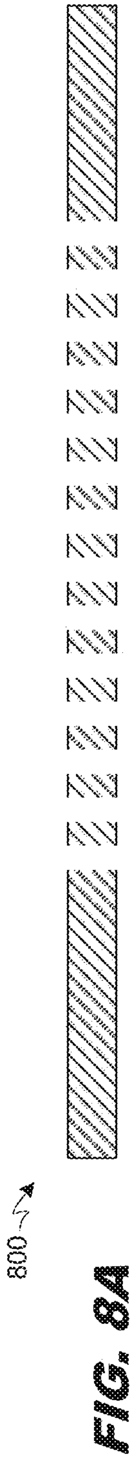
FIGS. 8A-8D depict optional variations in aperture shapes and dimensions.
Figure 8B:
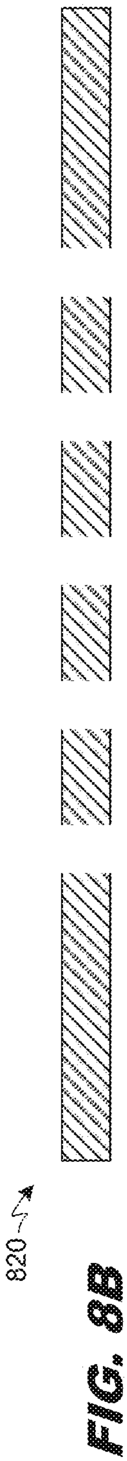
Figure 8C:
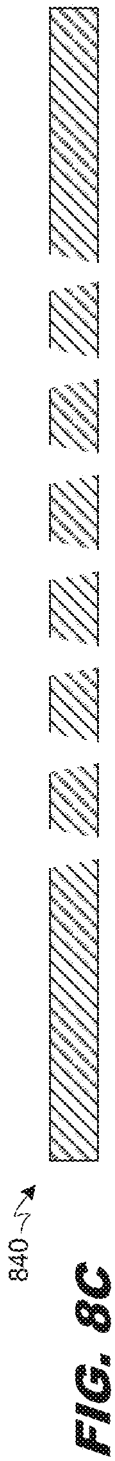
Figure 8D:
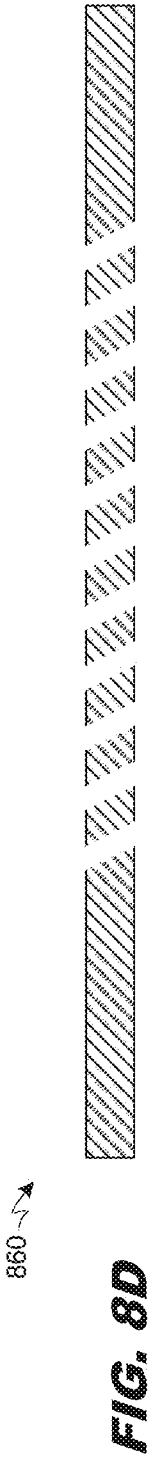

FIGS. 8A-8D depict optional variations in aperture shapes and dimensions. FIG. 8A depicts a series of apertures 800 as micro perforations. Micro perforations may be very small holes, and may be constructed, for example, by techniques such as laser cutting. Micro perforations may have a diameter smaller than a thickness of material into which the micro perforations are cut. FIG. 8B depicts a series of apertures 820 as small holes. Small holes may be constructed, for example, by techniques such as stamping or molding. FIG. 8C depicts a series of apertures 840 with a conical shape. The conical shapes have sloped sides creating a larger opening on one side and a smaller opening on the opposite side. FIG. 8D depicts a series of apertures 860 with angled sides. In the two-dimensional cross section depicted in FIG. 8D, both angled sides of each aperture are tilted in same direction, forming a parallelogram in cross section of the aperture, as compared to angled sides of each aperture in FIG. 8C which tilt in opposite directions from each other. The tilted apertures of FIG. 8D may be formed, for example, but cutting with a laser pointed at an angle off perpendicular relative to the surface of the diaphragm or cover being cut. The tilted apertures of FIG. 8D form path through each aperture that is at an angle off from the perpendicular to the surface in which the aperture is cut (e.g., at an angle that is different from a perpendicular to the cover or diaphragm).

The various shapes depicted in FIGS. 8A-8D may be manufactured using a variety of techniques, and the variations in dimension or shape of the apertures may produce different attributes, for example with a stronger or weaker water-impermissible attribute for water passing through an aperture from one side to the other. In an aspect, the variations of aperture shape and dimensions may be used in the apertures of path cover 752, port cover 754, diaphragm 250, and/or diaphragm 750, and may also be used in the apertures of individual lamina of diaphragms 250, 750.

In an aspect, conical apertures 840 may be configured with the narrower aperture of each conical shape on exposed to the front volume, such as 214 (FIG. 2) while the wider aperture of each conical shape may be exposed to a back volume, such as 216 (FIG. 2). The narrower aperture of each conical shape may be small enough to discourage fluid such as water from passing through the narrower portion of the aperture, while also facilitating easier manufacturing middle and wider portions of each aperture.

Figure 9:
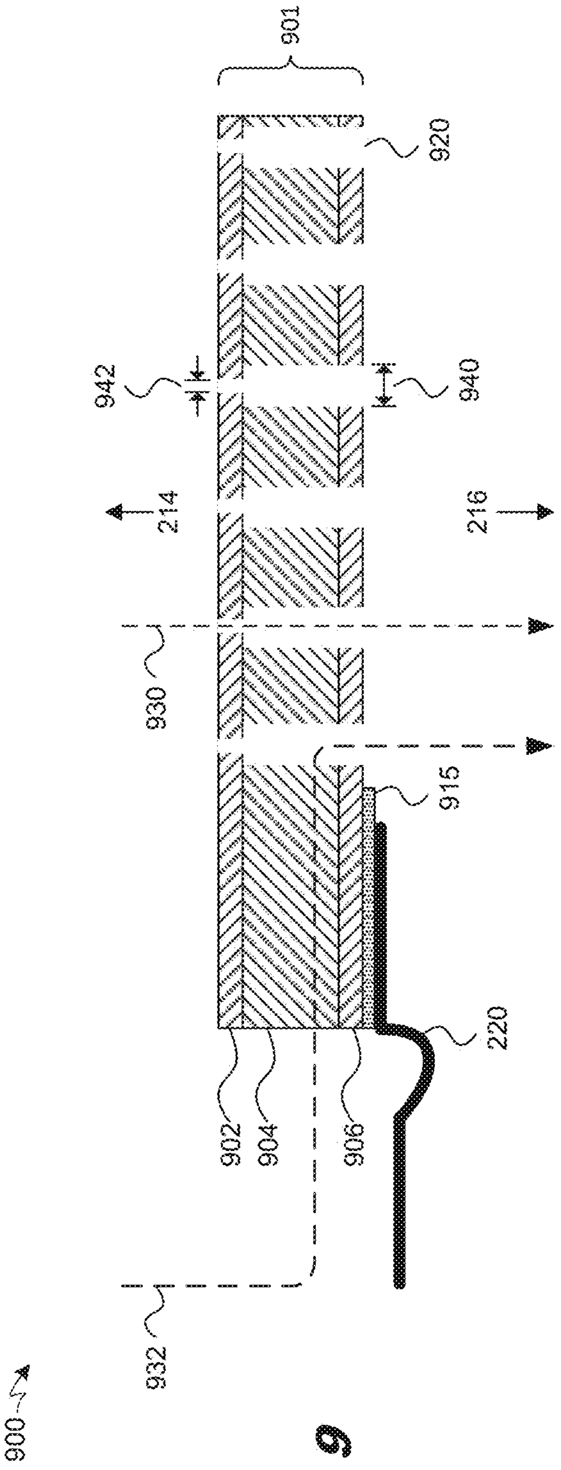
FIG. 9 is a cross-sectional side view of an acoustic diaphragm in accordance with various aspects of the subject technology.

FIG. 6A is a cross-sectional side view 900 of a laminate acoustic diaphragm 901 in accordance with various aspects of the subject technology. Diaphragm 901 may be one example laminate implementation of diaphragm 250 of FIG. 2. In the example of FIG. 9, diaphragm 901 includes three layers of lamina, first, second, and third, lamina 906, 904, and 902, respectively, including outer layer lamina 906, 902 and a middle layer lamina 904. Diaphragm 901 is mounted on driver support 220 at or near an edge of diaphragm 901. In an aspect, diaphragm 901 may be attached to driver support 220 via adhesive 915. Back volume 216 may be adjacent to a back surface of diaphragm 901, and the back surface of diaphragm 901 may include first lamina 906; front volume 214 may be adjacent to a top surface of diaphragm 901, and the top surface of diaphragm 901 may be composed of the third lamina 902.

In the example of FIG. 9, each laminae 906, 904 and 902 may include a series of co-located apertures 920 (only one of which is labeled in FIG. 9). Apertures 920 may be micro perforations, for example created by a laser. The apertures 920 may have dimensions small enough to prevent water passing through a top surface of diaphragm 901 the micro perforations while still allowing air or other gasses to pass through the micro perforations. In this way, the micro perforations may provide water-impermeable and gas-permeable attributes. In the example of FIG. 9, a diameter 942 of the perforations in a top surface of diaphragm 901 may be larger than a diameter 940 in a bottom surface of diaphragm 901. This may include, for example, smaller diameter perforations in lamina 902 exposed to front surface 214 and larger diameter perforations in lower lamina 904 and 906. The variable sized diameter of perforations may simplify manufacturing. For example, the lowest tolerance (highest required precision) for forming the perforations may be used for the lamina exposed to the front surface 214, while allowing for easier manufacturing of larger perforations in other lower laminae. In this way, only lamina 902 may be small enough to prevent water or other fluids from moving though the perforation and also large enough to allow air and other gasses to flow though the perforation. In an aspect, perforations 920 may be formed by a laser cutting tool, and a focus tolerance for the laser cutting tool may be lowest for the lamina 902 (e.g., 2.5 micrometers), while focus tolerance may be higher for other lamina (e.g., 10 micrometers).

In the Example of FIG. 9, two types of airflow paths may exist, including vertical path 930 though all laminae, and partly horizontal path 932 via a side surface of diaphragm 901. Outer laminae 906 and 902 may be composed of a first material with certain attributes, middle lamina 904 may be composed of a second material with different attributes. In an aspect, laminae 902 and 906 may have a gas-impermeable and water-impermeable attribute, while lamina 904 may have gas-permeable and water-impermeable attributes. For example, middle lamina 904 may be composed of a foam material such as Rohacell® with water-impermeable and gas-permeable attributes, and outer laminae 906, 902 may be composed of a solid material, such as a metal, with water-impermeable and gas-impermeable attributes.

Figure 10:
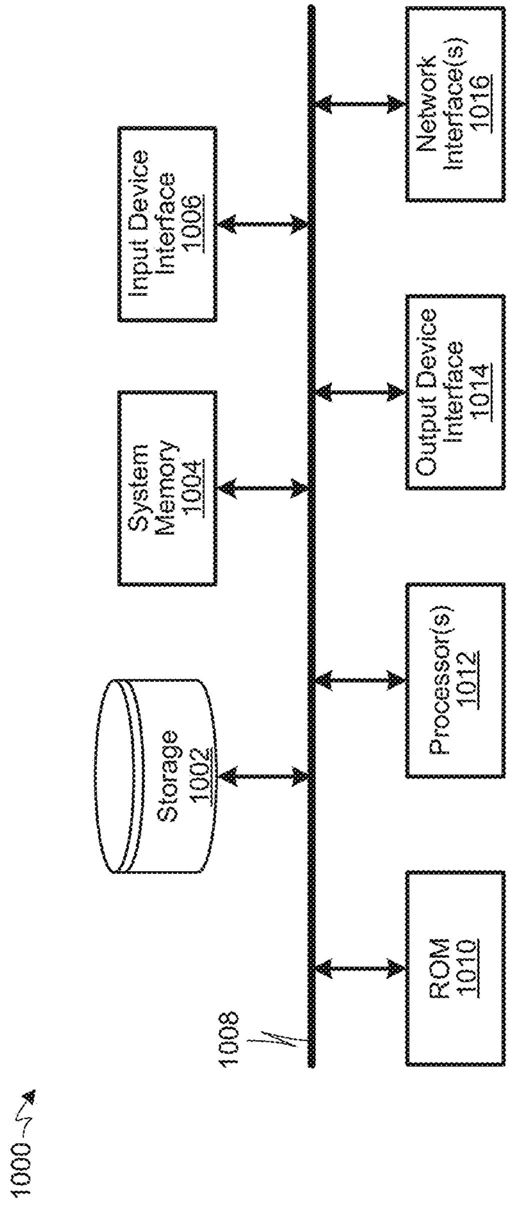
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, one or more of the electronic device 100 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1006, an output device interface 1014, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random-access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1006 and 1014. The input device interface 1006 enables a user to communicate information and select commands to the electronic system 1000. Input devices that may be used with the input device interface 1006 may include, for example, alphanumeric keyboards and pointing devices (also called "cursor control devices"). The output device interface 1014 may enable, for example, the display of images generated by electronic system 1000. Output devices that may be used with the output device interface 1014 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An acoustic transducer, comprising:

a diaphragm composed of at least a first lamina and a second lamina, and the diaphragm includes a front surface and includes a back surface formed at least in part by the first lamina, and wherein the second lamina is a gas-permeable membrane;

a front volume adjacent to the front surface;

a back volume adjacent to the back surface; and a first plurality of apertures in the first lamina, each aperture exposing, to the back volume, a corresponding portion of an inner surface of the second lamina, the inner surface extending over the first plurality of openings.

2. The acoustic transducer of claim 1, further comprising:

drive circuitry physically attached to the diaphragm; and wherein the acoustic transducer is a microphone, and the drive circuitry generates an electrical signal in response to changes in capacitance.

3. The acoustic transducer of claim 1, further comprising:

drive electronics physically attached to the diaphragm; and wherein the acoustic transducer is a speaker, and the drive electronics generate an electrical signal in response to changes in a magnetic field of a voice coil.

4. The acoustic transducer of claim 1, wherein apertures of the first plurality of apertures have a conical cross-sectional shape, where a diameter of the apertures on one side of the first lamina is larger than a diameter of the apertures on the other side of the first lamina.

5. The acoustic transducer of claim 1, wherein apertures of the first plurality of apertures have angled sides, forming a path through the first lamina different from a perpendicular through the first lamina.

6. The acoustic transducer of claim 1, wherein the diaphragm includes a side surface at an edge of the diaphragm, the side surface formed at least in part by the second lamina, and wherein the diaphragm comprises at least one airflow path between the front volume and the back volume, the airflow path extending through at least a portion of the second lamina via the side surface and the first plurality of apertures in the first lamina.

7. The acoustic transducer of claim 1, further comprising:

a driver support on which the diaphragm is mounted, wherein a portion of the back surface formed at least in part by the first lamina of the diaphragm is mounted to the driver support.

8. An acoustic transducer, comprising:

a diaphragm composed of at least a first lamina and a second lamina, and the diaphragm includes a front surface and includes a back surface formed at least in part by the first lamina, and wherein the second lamina has a gas-permeable attribute;

a front volume adjacent to the front surface;

a back volume adjacent to the back surface;

a first plurality of apertures in the first lamina, each aperture exposing a corresponding inner surface of the second lamina to the back volume; and a third lamina of the diaphragm composed of the same material as the first lamina, wherein the second lamina is layered between the first lamina and the third lamina and the front surface is formed at least in part by the third lamina.

9. The acoustic transducer of claim 8, further comprising:

a second plurality of apertures in the third lamina co-located with the first plurality of apertures in the first lamina, wherein each aperture of the second plurality of apertures exposes a corresponding second inner surface of the second lamina to the front volume.

10. The acoustic transducer of claim 8, further comprising:

a second plurality of apertures in the second lamina co-located with the first plurality of apertures in the first lamina;

a third plurality of apertures in the third lamina co-located with the first plurality of apertures in the first lamina; and wherein a diameter of the apertures of the first, second, and third pluralities of apertures is large enough to be gas-permeable and small enough to inhibit liquid permeability.

11. The acoustic transducer of claim 10, wherein the first, second, and third plurality of apertures are micro-perforations cut into the corresponding lamina by a laser.

12. The acoustic transducer of claim 8, further comprising a second plurality of apertures in the second lamina co-located with the first plurality of apertures in the first lamina;

a third plurality of apertures in the third lamina co-located with the first plurality of apertures in the first lamina; and wherein the apertures of the first, second, and third pluralities of apertures are micro-perforations.

13. The acoustic transducer of claim 1, further comprising:

a resonant chamber;

an acoustic path connecting the resonant chamber to the front volume;

a path cover across the acoustic path, the cover formed of a solid material and having first surface adjacent to the front volume and a second surface opposite the first surface adjacent to the acoustic path; and a plurality of apertures in the path cover connecting the first surface to the second surface.

14. The acoustic transducer of claim 13, wherein the plurality of apertures in the path cover are micro-perforations cut by laser into the solid material of the path cover.

15. The acoustic transducer of claim 13, wherein apertures of the plurality of apertures have a conical cross-sectional shape, where a diameter of the apertures on one side of the path cover is larger than a diameter of the apertures on the other side of the path cover.

16. The acoustic transducer of claim 13, wherein apertures of the plurality of apertures have angled sides, forming a path through the path cover different from a perpendicular through the path cover.

17. The acoustic transducer of claim 1, further comprising:

a housing of the acoustic transducer;

a port in the housing of the acoustic transducer;

a port cover across the port, the cover formed of a solid material having a first surface adjacent to the front volume and a second surface opposite the first surface adjacent to an exterior of the acoustic transducer; and a plurality of apertures in the port cover connecting the first surface to the second surface.

18. The acoustic transducer of claim 17, wherein the plurality of apertures in the port cover are micro-perforations cut by laser into the solid material of the port cover.

19. The acoustic transducer of claim 17, wherein apertures of the plurality of apertures have a conical cross-sectional shape, where a diameter of the apertures on one side of the port cover is larger than a diameter of the apertures on the other side of the port cover.

20. The acoustic transducer of claim 17, wherein apertures of the plurality of apertures have angled sides, forming a path through the port cover different from a perpendicular through the port cover.

21. An acoustic transducer, comprising:

a diaphragm composed of at least a first lamina, a second lamina, a third lamina, and a fourth lamina, wherein the second and fourth lamina are layered between the first and third lamina, and the diaphragm includes a front surface formed at least in part by the third lamina and a back surface formed at least in part by the first lamina;
- a front volume adjacent to the front surface;
- a back volume adjacent to the back surface;
- a first plurality of apertures in the first lamina;
- a second plurality of apertures in the second lamina co-located with the first plurality of apertures in the first lamina; and
- a third plurality of apertures in the third lamina co-located with the second plurality of apertures in the second lamina,
- wherein the fourth lamina of the diaphragm includes gas-permeable and water-impermeable attributes and the fourth lamina extends across the second plurality of apertures in the second lamina.

22. The acoustic transducer of claim 21, further comprising:
- a driver support on which the diaphragm is mounted, wherein
  - a portion of the back surface formed in part by the first lamina of the diaphragm is mounted to the driver support.

23. The acoustic transducer of claim 21, wherein the diaphragm includes a side surface at an edge of the diaphragm and adjacent to the front volume, the side surface formed at least in part by the second lamina, and wherein the diaphragm comprises:
- a first airflow path between the front volume and the back volume via the first plurality of apertures, the second plurality of apertures, the third plurality of apertures and through the fourth lamina, and
- a second airflow path between the front volume and the back volume, the second airflow path extending through at least a portion of the second lamina via the side surface and the first plurality of apertures in the first lamina.

24. The acoustic transducer of claim 21, further comprising:
- a fifth lamina between the first lamina and the fourth lamina,
- wherein the fifth lamina and second lamina are composed of the same material, and wherein the second lamina is layered between the fourth lamina and the third lamina.

25. The acoustic transducer of claim 21, wherein the fourth lamina is adjacent to the first lamina.

26. An electronic device, comprising:
- an acoustic transducer, the acoustic transducer comprising:
  - a diaphragm composed of at least a first lamina and a second lamina, and the diaphragm includes a front surface and includes a back surface formed at least in part by the first lamina, and wherein the second lamina is a gas-permeable membrane;
  - a front volume adjacent to the front surface;
  - a back volume adjacent to the back surface; and
  - a first plurality of apertures in the first lamina, each aperture exposing, to the back volume, a corresponding portion of an inner surface of the second lamina, the inner surface extending over the first plurality of openings.

27. The electronic device of claim 26, wherein the diaphragm includes a plurality of airflow paths between the front volume and the back volume, each of the plurality of airflow paths extending through a corresponding aperture of the first plurality of apertures, through the corresponding inner surface of the second lamina, and through at least a portion of the second lamina.

28. The electronic device of claim 26, wherein the acoustic transducer further comprises:
- a resonant chamber;
- an acoustic path connecting the resonant chamber to the front volume;
- a solid cover across the acoustic path, the solid cover having first surface adjacent to the front volume and a second surface opposite the first surface adjacent to the acoustic path; and
- a plurality of apertures in the cover connecting the first surface to the second surface.

29. The electronic device of claim 26, wherein the acoustic transducer further comprises:
- a housing of the acoustic transducer;
- a port in the housing of the acoustic transducer;
- a cover across the port, the cover having a first surface adjacent to the front volume and a second surface opposite the first surface adjacent to an exterior of the electronic device; and
- a plurality of apertures in the cover connecting the first surface to the second surface.

* * * * *